US012593215B2

(12) United States Patent
Mou et al.

(10) Patent No.: US 12,593,215 B2
(45) Date of Patent: Mar. 31, 2026

(54) MOBILE DEVICE MANAGEMENT AND CONTROL METHOD AND APPARATUS

(71) Applicant: Chengdu Vantron Technology Co., Ltd., Chengdu (CN)

(72) Inventors: Quanyong Mou, Chengdu (CN); Bo Wei, Chengdu (CN)

(73) Assignee: Chengdu Vantron Technology Co., Ltd., Chengdu (CN)

( * ) Notice: Subject to any disclaimer, the term of this patent is extended or adjusted under 35 U.S.C. 154(b) by 123 days.

(21) Appl. No.: 18/439,371

(22) Filed: Feb. 12, 2024

(65) Prior Publication Data

US 2024/0292226 A1    Aug. 29, 2024

(30) Foreign Application Priority Data

Feb. 23, 2023    (CN) .......................... 202310155192.2

(51) Int. Cl.
| | |
|---|---|
| *H04L 29/06* | (2006.01) |
| *H04L 9/06* | (2006.01) |
| *H04W 12/04* | (2021.01) |
| *H04W 12/37* | (2021.01) |

(52) U.S. Cl.
CPC .......... *H04W 12/37* (2021.01); *H04L 9/0643* (2013.01); *H04W 12/04* (2013.01); *H04L 2209/80* (2013.01)

(58) Field of Classification Search
CPC ..... H04W 12/37; H04W 12/04; H04W 12/30; H04L 9/0643; H04L 2209/80; H04L 63/04; H04L 63/0407; H04L 63/0428; H04L 63/10; H04L 63/20; G06F 21/62
See application file for complete search history.

(56) References Cited

U.S. PATENT DOCUMENTS

| | | | |
|---|---|---|---|
| 9,756,086 B1 * | 9/2017 | McHugh ............. | H04L 65/1069 |
| 10,693,724 B1 * | 6/2020 | Sethi ........................ | H04L 67/63 |
| 11,388,199 B2 * | 7/2022 | Maynard ............... | H04L 63/102 |
| 2013/0073901 A1 * | 3/2013 | Syrgabekov .......... | H04L 63/123 |
| | | | 714/6.24 |
| 2017/0272242 A1 * | 9/2017 | Morrell ................. | H04L 9/3242 |
| 2022/0272117 A1 * | 8/2022 | Maheve ............. | H04L 63/1416 |
| 2022/0329486 A1 * | 10/2022 | Nagaprakash ...... | H04L 43/0811 |
| 2024/0007482 A1 * | 1/2024 | Albero ................ | H04L 63/0428 |
| 2024/0020397 A1 * | 1/2024 | Shachar ............. | G06F 21/6218 |
| 2024/0224186 A1 * | 7/2024 | Zhou ................. | H04W 52/0216 |
| 2024/0256525 A1 * | 8/2024 | Manamohan ....... | G06F 21/6218 |

* cited by examiner

*Primary Examiner* — Malcolm Cribbs

(74) *Attorney, Agent, or Firm* — SALIWANCHIK, LLOYD & EISENSCHENK

(57) ABSTRACT

The present invention provides a mobile device management and control method and apparatus. The method includes the following steps: A web end operates a policy form, and sends policy form data obtained after the operation is completed to a server for processing and generating a policy form code; and a mobile terminal requests to obtain the policy form code from the server, and sends a unique identifier of the mobile terminal and the policy form code to the server for processing and generating a unique identifier. In the present invention, encoded data is exchanged between the mobile terminal and the server at intervals, which resolves a problem that when the mobile terminal is managed and controlled, when the network fluctuates or the mobile terminal stays in an always-on display state for a long time, a connection is broken.

16 Claims, 2 Drawing Sheets

MOBILE DEVICE MANAGEMENT AND CONTROL METHOD AND APPARATUS

CROSS-REFERENCE TO RELATED APPLICATION

This application claims the benefit of Chinese Patent Application No 202310155192.2, filed Feb. 23, 2023, the disclosure of which is incorporated by reference herein in its entirety.

TECHNICAL FIELD

The present invention relates to the field of mobile device management and control technologies, and in particular, to a mobile device management and control method and apparatus.

BACKGROUND

Mobile device management software appeared in the early 21st century as a way to control and protect personal digital assistants and smart phones that business workers started to use. The launch of Apple's iPhone in 2007 led to a boom in smart phone consumption and a trend towards bring your own device (BYOD), which further stimulated people's interest in MDM.

MDM, mobile device management (Mobile Device Management), is a process of managing life cycles of mobile devices used in workplaces. Through MDM management, enterprises can monitor and manage mobile devices, and protect their mobile devices, to ensure device performance and secure use of devices.

In the prior art, when a mobile device is managed and controlled, a connection is broken when the network fluctuates, or the connection is broken when the mobile device stays in an always-on display state for a long time, resulting in that data cannot be synchronized. In addition, in the prior art, most persistent connections are quite resource-consuming.

SUMMARY

An objective of the present invention is to provide a mobile device management and control method and apparatus to resolve the following problems in the prior art: when a mobile device is managed and controlled, a connection is broken when the network fluctuates, or the connection is broken when the mobile device stays in an always-on display state for a long time, resulting in that data cannot be synchronized; and most long connections are quite resource-consuming.

To achieve the foregoing objective of the present invention, the present invention provides the following technical solutions:

A mobile device management and control method is provided, including the following steps:

S1. A web end operates a policy form, and sends policy form data obtained after the operation is completed to a server for processing and generating a policy form code.

S2. A mobile terminal requests to obtain the policy form code from the server, and the mobile terminal sends a unique identifier of the mobile terminal and the policy form code to the server for processing and generating a unique identifier to be returned to the mobile terminal; and the mobile terminal performs a hash algorithm operation on the unique identifier and a private key, and performs md5 encryption to generate encoded data, where the encoded data is exchanged between the mobile terminal and the server at intervals, to ensure a stable connection between the mobile terminal and the server.

S3. The mobile terminal sends the unique identifier to the server, and the server queries a secure memory area to obtain policy data and returns the policy data to the mobile terminal, where the secure memory area stores the unique identifier and a network license corresponding to the unique identifier; and after the mobile terminal receives the policy data and the policy data takes effect, the mobile terminal establishes a stable persistent connection to the server.

S4. After the persistent connection takes effect, the web end sends a policy command that needs to be changed to the server, the server sends a response instruction to the mobile terminal, the mobile terminal responds to a success flag after receiving the response instruction, the server manages and controls the mobile terminal by using the success flag, and the web end manages and controls the mobile terminal by requesting to obtain a management and control state of the server.

S5. A maximum connection time for the persistent connection between the mobile terminal and the server is preset, and when a time for the persistent connection is greater than the maximum connection time, the mobile terminal is disconnected from the server, and the mobile terminal suspends ongoing tasks, where the tasks include downloading data and requesting data, to reduce resource consumption caused by the persistent connection; and when the mobile terminal sends $\alpha$ kb data to the server, where $\alpha \geq 0$, the mobile terminal splits the data into $\beta$ pieces, and separately transmits the $\beta$ pieces of data to the server, where $\beta$ is a positive integer, thereby reducing a data loss caused by a data packet loss.

Preferably, in step S1, the policy form code is generated by using a preset algorithm of the server.

Preferably, step S1 further includes a manner of generating the policy form: The mobile terminal scans a QR code, and sends a parameter obtained after parsing the QR code and the unique identifier to the server for processing and generating the policy form code.

Preferably, in step S2, the encoded data is exchanged between the mobile terminal and the server at intervals of 1 to 2 minutes.

Preferably, in step S4, the managing and controlling includes: controlling screen brightness, sound, Bluetooth, and Wi-Fi of the mobile terminal, obtaining positioning information of the mobile terminal, and performing device retrieval.

Preferably, the management and control method further includes geographical fence management and control, and the geographical fence management and control is: A management and control area of the mobile terminal is preset on the web end; when a signal sent by the mobile terminal is in this area, the web end normally manages and controls the mobile terminal; and when a signal sent by the mobile terminal goes beyond this area, the server sends an instruction to lock the mobile terminal, to ensure data security on the mobile terminal.

Preferably, an MQTT protocol is used for establishing a stable persistent connection between the mobile terminal and the server, where the MQTT protocol has characteristics of being lightweight, simple, open, and easy to implement.

Preferably, the MQTT protocol uses QoS1.

The present invention further provides a mobile device management and control apparatus, including a server, where the server includes at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute any one of the foregoing mobile device management and control methods.

Compared with the prior art, the present invention has the following beneficial effects:

1. In the present invention, the mobile terminal performs a hash algorithm operation on the unique identifier and a private key, and performs md5 encryption to generate encoded data, where the encoded data is exchanged between the mobile terminal and the server at intervals, to resolve a problem that when the mobile terminal is managed and controlled, a connection is broken when the network fluctuates, or the connection is broken when the mobile terminal stays in an always-on display state for a long time.

2. In the present invention, the maximum connection time for the persistent connection between the mobile terminal and the server is preset, and when a time for the persistent connection is greater than the maximum connection time, the mobile terminal is disconnected from the server, and the mobile terminal suspends ongoing tasks, where the tasks include downloading data and requesting data, to reduce resource consumption caused by the persistent connection; and when the mobile terminal sends $\alpha$ kb data to the server, where $\alpha \geq 0$, the mobile terminal splits the data into $\beta$ pieces, and separately transmits the $\beta$ pieces of data to the server, where $\beta$ is a positive integer, thereby reducing a data loss caused by a packet loss under a poor network condition.

DESCRIPTION OF EMBODIMENTS

The following further describes the present invention in detail with reference to test cases and specific implementations. However, it should not be understood that the scope of the above-mentioned subject matter of the present invention is limited to the following embodiments, and all technologies implemented based on the contents of the present invention belong to the scope of the present invention.

Embodiment 1

Figure 1:
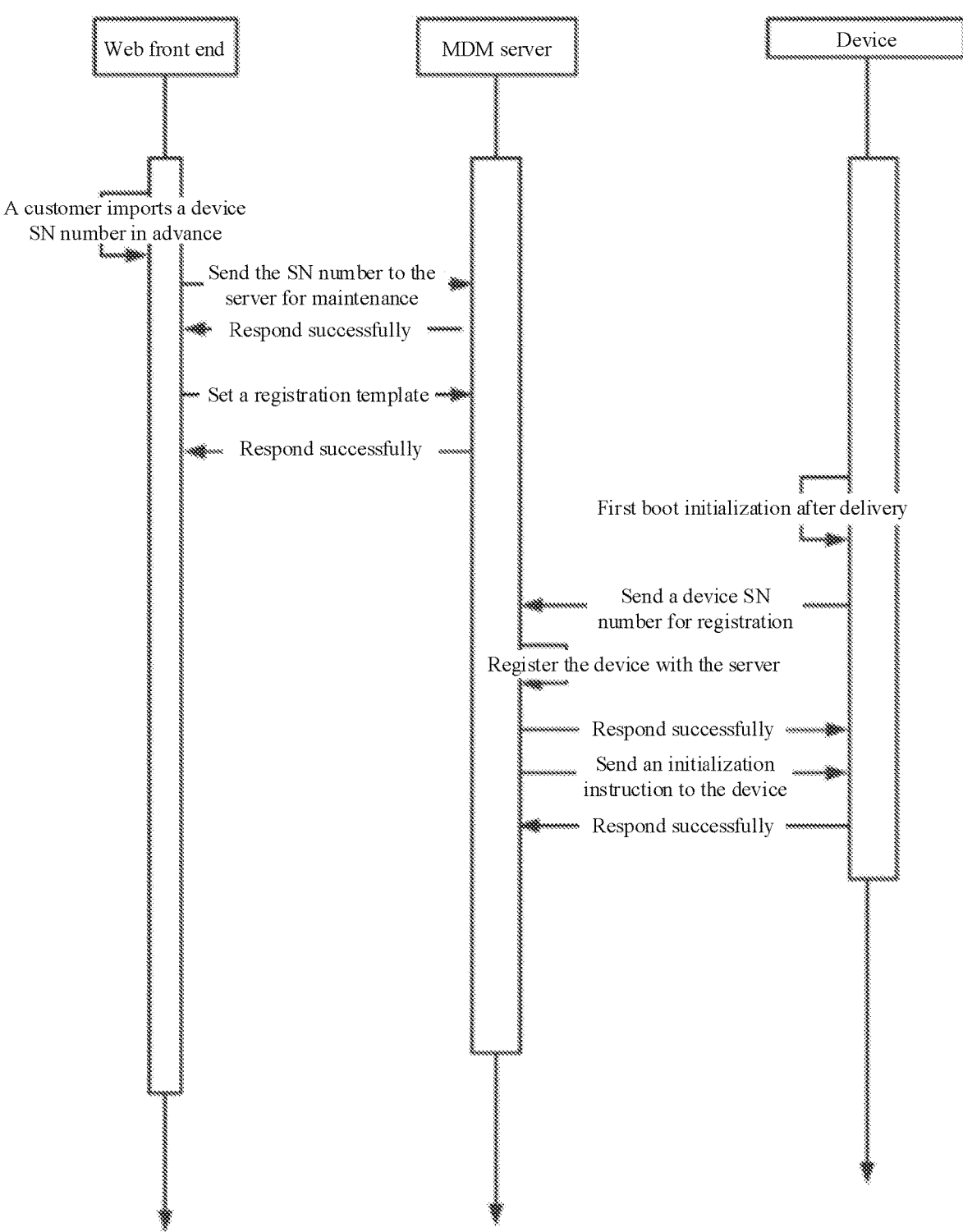
FIG. 1 is a schematic diagram of an operating principle according to the present invention.
Figure 2:
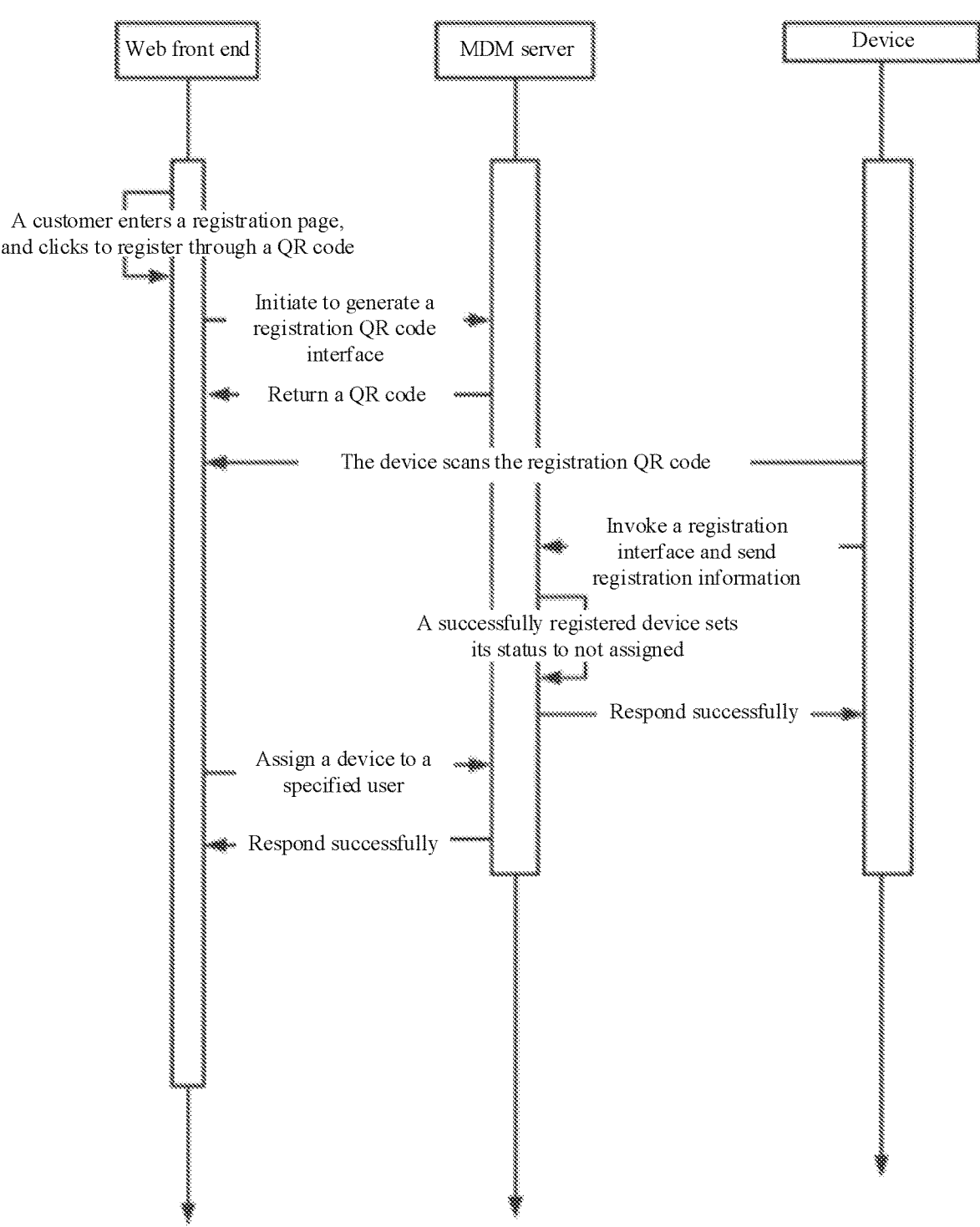
FIG. 2 is a schematic diagram of working when a policy form is a QR code according to the present invention.

Refer to FIG. 1 and FIG. 2 together. This embodiment provides a mobile device management and control method, including the following steps:

S1. A web end operates a policy form, and sends policy form data obtained after the operation is completed to a server for processing and generating a policy form code.

S2. A mobile terminal requests to obtain the policy form code from the server, and the mobile terminal sends a unique identifier of the mobile terminal and the policy form code to the server for processing and generating a unique identifier to be returned to the mobile terminal; and the mobile terminal performs a hash algorithm operation on the unique identifier and a private key, and performs md5 encryption to generate encoded data, where the encoded data is exchanged between the mobile terminal and the server at intervals, to ensure a stable connection between the mobile terminal and the server. This resolves a problem that when the mobile terminal is managed and controlled, a connection is broken when the network fluctuates, or the connection is broken when the mobile terminal stays in an always-on display state for a long time.

S3. The mobile terminal sends the unique identifier to the server, and the server queries a secure memory area to obtain policy data and returns the policy data to the mobile terminal, where the secure memory area stores the unique identifier and a network license corresponding to the unique identifier; and after the mobile terminal receives the policy data and the policy data takes effect, the mobile terminal establishes a stable persistent connection to the server.

S4. After the persistent connection takes effect, the web end sends a policy command that needs to be changed to the server, the server sends a response instruction to the mobile terminal, the mobile terminal responds to a success flag after receiving the response instruction, the server manages and controls the mobile terminal by using the success flag, and the web end manages and controls the mobile terminal by requesting to obtain a management and control state of the server.

S5. A maximum connection time for the persistent connection between the mobile terminal and the server is preset, and when a time for the persistent connection is greater than the maximum connection time, the mobile terminal is disconnected from the server, and the mobile terminal suspends ongoing tasks, where the tasks include downloading data and requesting data, to reduce resource consumption caused by the persistent connection. In the present invention, the maximum connection time for the persistent connection between the mobile terminal and the server is preset, and the mobile terminal splits data into $\beta$ pieces, and separately transmits the $\beta$ pieces of data to the server, thereby reducing a data loss caused by a packet loss under a poor network condition.

Embodiment 2

Refer to FIG. 1 and FIG. 2 together. In this embodiment, further improvement and optimization are performed on the basis of Embodiment 1. To be specific, in step S1, the policy form code is generated by using a preset algorithm of the server.

Step S1 further includes a manner of generating the policy form: The mobile terminal scans a QR code, and sends a parameter obtained after parsing the QR code and the unique identifier to the server for processing and generating the policy form code.

In step S2, the encoded data is exchanged between the mobile terminal and the server at intervals of 1 to 2 minutes.

In step S4, the managing and controlling includes: controlling screen brightness, sound, Bluetooth, and Wi-Fi of the mobile terminal, obtaining positioning information of the mobile terminal, and performing device retrieval.

The management and control method further includes geographical fence management and control, and the geographical fence management and control is: A management and control area of the mobile terminal is preset on the web end; when a signal sent by the mobile terminal is in this area, the web end normally manages and controls the mobile terminal; and when a signal sent by the mobile terminal goes beyond this area, the server sends an instruction to lock the mobile terminal, to ensure data security on the mobile terminal.

An MQTT protocol is used for establishing a stable persistent connection between the mobile terminal and the server.

The MQTT protocol uses QoS1.

Embodiment 3

Refer to FIG. 1 to FIG. 2 together. As shown in the figures, this embodiment provides a mobile device management and control method, including the following steps:

S1. A web end scans a QR code to generate form information, performs filling, that is, operates the policy form, and sends form information data to a server for processing and generating a policy form code.

S2. A mobile terminal requests to obtain the policy form code from the server, and the mobile terminal sends at least one of unique identifiers including an SN number, an IMEI1, and an IMEI2 of the mobile terminal and the policy form code to the server for processing and generating a unique identifier to be returned to the mobile terminal; and the mobile terminal performs a hash algorithm operation on the unique identifier and a private key, and performs md5 encryption to generate encoded data, where the encoded data is, for example, 99DAD190A6906A2166A086FAB5C8D147, and is exchanged between the mobile terminal and the server at intervals of 1 to 2 minutes, to ensure a stable connection between the mobile terminal and the server, thereby resolving a problem that when the mobile terminal is managed and controlled, a connection is broken when the network fluctuates, or the connection is broken when the mobile terminal stays in an always-on display state for a long time.

S3. The mobile terminal sends the unique identifier to the server, and the server queries a secure memory area to obtain policy data and returns the policy data to the mobile terminal, where the secure memory area stores the unique identifier and a network license corresponding to the unique identifier; and after the mobile terminal receives the policy data and the policy data takes effect, the mobile terminal establishes a stable persistent connection to the server by using an MQTT protocol, where the MQTT protocol uses QoS1.

S4. After a persistent connection of the MQTT is successfully established, the web end sends a policy command that needs to be changed to the server, the server sends a response instruction to the mobile terminal, the mobile terminal responds to a success flag after receiving the response instruction, the server manages and controls the mobile terminal by using the success flag, and the web end manages and controls the mobile terminal by requesting to obtain a management and control state of the server; and the web end controls screen brightness, sound, Bluetooth, and Wi-Fi of the mobile terminal, obtains positioning information of the mobile terminal, and performs device retrieval.

S5. A maximum connection time for the persistent connection between the mobile terminal and the server is preset to 3 hours, and when a time for the persistent connection is greater than 3 hours, the mobile terminal is disconnected from the server, and the mobile terminal suspends ongoing tasks, where the tasks include downloading data and requesting data, to reduce resource consumption caused by the persistent connection; in addition, when the mobile terminal sends $\alpha$ kb data to the server, where $\alpha \geq 0$, the

6 mobile terminal splits the data into $\beta$ pieces, and separately transmits the $\beta$ pieces of data to the server, where $\beta$ is a positive integer, to reduce a data loss caused by a packet loss under a poor network condition. The maximum connection time for the persistent connection between the mobile terminal and the server is preset, and the mobile terminal splits data into $\beta$ pieces, and separately transmits the $\beta$ pieces of data to the server, thereby reducing resource consumption caused by the persistent connection and reducing a data loss caused by a packet loss under a poor network condition.

The management and control method further includes geographical fence management and control, and the geographical fence management and control is: A management and control area of the mobile terminal is preset on the web end; when a signal sent by the mobile terminal is in this area, the web end normally manages and controls the mobile terminal; when a signal sent by the mobile terminal goes beyond this area, the server sends an instruction to lock the mobile terminal, to ensure data security on the mobile terminal and achieve a purpose of device management and control; and a GPS module included in the mobile terminal obtains corresponding longitude and latitude, and the server parses the corresponding longitude and latitude of the mobile terminal to obtain specific geographical location information, and then forwards the geographical location information to the web end, so that the web end can monitor a specific location of the current device in real time.

This embodiment further provides a mobile device management and control apparatus, including a server, where the server includes at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method described in the foregoing embodiment.

The foregoing descriptions are merely example embodiments of the present invention, and are not intended to limit the present invention. Any modification, equivalent replacement, improvement, and the like made in the spirit and principles of the present invention shall fall within the protection scope of the present invention.

What is claimed is:

1. A mobile device management and control method, comprising the following steps:

S1) operating, by a web end, a policy form, and sending policy form data obtained after the operation is completed to a server for processing and generating a policy form code;

S2) requesting, by a mobile terminal, to obtain the policy form code from the server, sending, by the mobile terminal, a unique identifier of the mobile terminal and the policy form code to the server for processing and generating the unique identifier to be returned to the mobile terminal, and performing, by the mobile terminal, a hash algorithm operation on the unique identifier and a private key, and performing md5 encryption to generate encoded data, wherein the encoded data is exchanged between the mobile terminal and the server at intervals, to ensure a stable connection between the mobile terminal and the server;

S3) sending, by the mobile terminal, the unique identifier to the server, and querying, by the server, a secure memory area to obtain policy data and returning the policy data to the mobile terminal, wherein the secure memory area stores the unique identifier and a network license corresponding to the unique identifier, and after the mobile terminal receives the policy data and the policy data takes effect, the mobile terminal establishes a stable persistent connection to the server;

S4) after the persistent connection takes effect, sending, by the web end, a policy command that needs to be changed to the server, sending, by the server, a response instruction to the mobile terminal, responding, by the mobile terminal, to a success flag after receiving the response instruction, managing and controlling, by the server, the mobile terminal by using the success flag, and managing and controlling, by the web end, the mobile terminal by requesting to obtain a management and control state of the server; and S5) presetting a maximum connection time for the persistent connection between the mobile terminal and the server, and when a time for the persistent connection is greater than the maximum connection time, disconnecting the mobile terminal from the server, and suspending, by the mobile terminal, ongoing tasks, wherein the tasks comprise downloading data and requesting data, to reduce resource consumption caused by the persistent connection; and when the mobile terminal sends $\alpha$ kilobyte (KB) data to the server, wherein $\alpha \geq 0$, the mobile terminal splits the data into $\beta$ pieces, and separately transmits the $\beta$ pieces of data to the server, wherein $\beta$ is a positive integer, thereby reducing a data loss caused by a data packet loss.

2. The mobile device management and control method according to claim 1, wherein in step S1, the policy form code is generated by using a preset algorithm of the server.

3. The mobile device management and control method according to claim 1, wherein step S1 further comprises a manner of generating the policy form: scanning, by the mobile terminal, a quick response (QR) code, and sending a parameter obtained after parsing the quick response (QR) code and the unique identifier to the server for processing and generating the policy form code.

4. The mobile device management and control method according to claim 1, wherein in step S2, the encoded data is exchanged between the mobile terminal and the server at intervals of 1 to 2 minutes.

5. The mobile device management and control method according to claim 1, wherein in step S4, the managing and controlling comprises: controlling screen brightness, sound, Bluetooth, and Wi-Fi of the mobile terminal, obtaining positioning information of the mobile terminal, and performing device retrieval.

6. The mobile device management and control method according to claim 1, wherein the management and control method further comprises geographical fence management and control, and the geographical fence management and control is: a management and control area of the mobile terminal is preset on the web end; when a signal sent by the mobile terminal is in this area, the web end normally manages and controls the mobile terminal; and when a signal sent by the mobile terminal goes beyond this area, the server sends an instruction to lock the mobile terminal.

7. The mobile device management and control method according to claim 1, wherein an message queuing telemetry transport (MQTT) protocol is used for establishing a stable persistent connection between the mobile terminal and the server.

8. The mobile device management and control method according to claim 7, wherein the message queuing telemetry transport (MQTT) protocol uses quality of service1 (QoS1).

9. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 1.

10. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 2.

11. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 3.

12. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 4.

13. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 5.

14. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 6.

15. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 7.

16. A mobile device management and control apparatus, comprising a server, wherein the server comprises at least one processor, at least one communication module, and a memory that is communicatively connected to the at least one processor; and the at least one communication module is separately communicatively connected to a web end and a mobile terminal, the memory stores instructions that may be executed by the at least one processor, and the instructions are executed by the at least one processor, so that the at least one processor can execute the mobile device management and control method according to claim 8.

* * * * *